US012781704B2

(12) United States Patent
Fajar et al.

(10) Patent No.: US 12,781,704 B2
(45) Date of Patent: Nov. 3, 2026

(54) WIND TURBINE

(71) Applicant: Vestas Wind Systems A/S, Aarhus (DK)

(72) Inventors: Mohammed Fajar, Hinnerup (DK); Nils Martin, Horsens (DK); Robert Thomas Rudolf, Aarhus (DK); Christian Frier Hvejsel, Brabrand (DK); Søren Steffensen, Brabrand (DK)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 18/872,876

(22) PCT Filed: Jun. 8, 2023

(86) PCT No.: PCT/DK2023/050141
§ 371 (c)(1),
(2) Date: Dec. 9, 2024

(87) PCT Pub. No.: WO2023/237169
PCT Pub. Date: Dec. 14, 2023

(65) Prior Publication Data

US 2025/0369418 A1 Dec. 4, 2025

(30) Foreign Application Priority Data

Jun. 10, 2022 (DK) ............................ PA 202270309

(51) Int. Cl.
*F03D 1/06* (2006.01)
*F03D 7/02* (2006.01)

(52) U.S. Cl.
CPC ......... *F03D 1/0681* (2023.08); *F03D 1/0675* (2013.01); *F03D 1/065* (2013.01);
(Continued)

(58) Field of Classification Search
CPC .... F03D 1/0681; F03D 1/0675; F03D 1/0677; F03D 1/065; F03D 7/0224; F05B 2240/30
See application file for complete search history.

(56) References Cited

U.S. PATENT DOCUMENTS 4,403,916 A 9/1983 Skelskey
2009/0208337 A1 8/2009 Chambers
(Continued)

FOREIGN PATENT DOCUMENTS

CN 201810482 U * 4/2011
CN 104612896 A * 5/2015
(Continued)

OTHER PUBLICATIONS

Danish Patent and Trademark Office, Search and Exam Report, Buus, Ole G., Nov. 30, 2022, 8 Pages.
Patent Cooperation Treaty, International Searching Authority, International Search Report and Written Opinion, Dated Sep. 7, 2023, 12 Pages.

*Primary Examiner* — Courtney D Heinle
*Assistant Examiner* — Art Golik
(74) *Attorney, Agent, or Firm* — Wood Herron & Evans LLP

(57) ABSTRACT

A pitch controlled wind turbine comprising a tower, a nacelle mounted on the tower, a hub mounted rotatably on the nacelle, and at least three wind turbine blades, wherein each wind turbine blade extends between a root end connected to the hub via a pitch mechanism, and a tip end; the wind turbine further comprising at least three blade connecting members, each blade connecting member extending between from a connection point on one wind turbine blade and towards a connection point on a neighbouring wind turbine blade, the connecting points each located at a connection region of a respective blade; and each wind turbine blade comprising a spar cap extending in a blade spanwise outboard direction between the root end and the tip end, and
(Continued)

a reinforcing member having an anchor end and a connection end, the connection end having the connection point, the reinforcing member extending continuously from the connection point to the anchor end which overlaps a portion of the spar cap outboard of the connection point so as to transfer load between the spar cap and the respective connecting member.

23 Claims, 13 Drawing Sheets

(52) U.S. Cl.
CPC .......... *F03D 1/0677* (2023.08); *F03D 7/0224* (2013.01); *F05B 2240/30* (2013.01)

(56) References Cited

U.S. PATENT DOCUMENTS

| | | | | |
|---|---|---|---|---|
| 2010/0086407 | A1 | 4/2010 | Holmoy | |
| 2012/0051914 | A1* | 3/2012 | Dehlsen | F03D 7/0228 416/147 |
| 2019/0152168 | A1* | 5/2019 | Tobin | B29C 70/54 |

FOREIGN PATENT DOCUMENTS

| | | | | | |
|---|---|---|---|---|---|
| CN | 106089573 | A | * | 11/2016 | F03D 1/065 |
| EP | 2112372 | A1 | | 10/2009 | |
| EP | 2142795 | B1 | | 6/2017 | |
| WO | WO-8602701 | A1 | * | 5/1986 | F03D 1/0658 |

* cited by examiner

WIND TURBINE

FIELD OF THE INVENTION

The present invention relates to a pitch controlled wind turbine, and a method of manufacturing a wind turbine blade of a wind turbine.

BACKGROUND OF THE INVENTION

Wind turbine blades are subject to various loads, such as aerodynamic loads generated by the wind. These may include air pressure on the wind turbine blades, and changing wind speed and direction. The wind turbine will also be subject to the dead weight of the wind turbine blade itself.

There is a continued drive to produce larger wind turbine blades, due to the increased energy production that is produced. Yet, as the size of wind turbine blades continues to increase, the loads on the wind turbine blades also continue to increase. The increased loads often require further reinforcement of the blades, however this reinforcement further increases the weight of the blades, with a subsequent further increase in the loads acting on the blades.

SUMMARY OF THE INVENTION

A first aspect of the invention provides a pitch controlled wind turbine comprising a tower, a nacelle mounted on the tower, a hub mounted rotatably on the nacelle, and at least three wind turbine blades, wherein each wind turbine blade extends between a root end connected to the hub via a pitch mechanism, and a tip end; the wind turbine further comprising at least three blade connecting members, each blade connecting member extending from a connection point on one wind turbine blade towards a connection point on a neighbouring wind turbine blade, the connecting points each located at a connection region of a respective blade; and each wind turbine blade comprising a spar cap extending in a blade spanwise outboard direction between the root end and the tip end, and a reinforcing member having an anchor end and a connection end, the connection end having the connection point, the reinforcing member extending continuously from the connection point to the anchor end which overlaps a portion of the spar cap so as to transfer load between the spar cap and the respective connecting member.

The anchor end may overlap the portion of the spar cap outboard of the connection point.

The reinforcing member may be integral with the spar cap. The reinforcing member may be co-bonded with the spar cap.

The reinforcing member may include a fibre-reinforced composite material.

A majority of the fibres of the fibre-reinforced composite material may be oriented generally towards the blade spanwise direction. A majority of the fibres may be oriented within 20 degrees of the spanwise direction of the blade.

The reinforcing member may extend around a portion of the connection point. Fibres of the reinforcing member may be continuous around the portion of the connection point.

A width of the reinforcing member in a chordwise direction between a leading edge and a trailing edge of the blade may increase outboard from the connection point up to an inboard edge of the anchor end.

The reinforcing member may extend from the connection end and overlap an inner side of the spar cap and an outer side of the spar cap.

The spar cap may have a longitudinal axis which deviates in a blade thickness direction on either side of the reinforcing member.

The spar cap may be continuous between the root end and the tip end.

The connection region may have a leading edge forward of a leading edge of the blade inboard of the connection region and forward of a leading edge of the blade outboard of the connection region. The connection point may be located forward of the leading edge of the blade inboard of the connection region and forward of the leading edge outboard of the connection region The leading edge of the connection region may be smoothly blended into the blade leading edge outboard of the connection region.

The leading edge of the connection point may be located on a pressure side of the blade.

Each connection point may comprise a connector. The connector may be embedded in the reinforcing member.

The reinforcing member may include a core material. The core material may change thickness between the connection end and the anchor end so as to adapt the thickness of the reinforcing member.

A thickness of the core material may taper away from the connection end so as to reduce in thickness towards the anchor end.

Each connection point may comprise a bearing structure configured to provide freedom of movement of the connecting member about at least one axis.

A first connecting member and a second connecting member may extend from the connection point.

The wind turbine may be an upwind wind turbine.

A second aspect of the invention provides a method of manufacturing a wind turbine blade, comprising: providing a blade mould, the blade mould shaped to form a blade having a connection region; laying a reinforcing member into the blade mould at the connection region; placing a spar cap into the mould and on top of the reinforcing member; placing a connector into the mould at a connection end of the reinforcing member such that the reinforcing member extends continuously from the connector to an anchor end of the reinforcing member, wherein the anchor end overlaps a portion of the spar cap, and wherein the connector is for coupling to a corresponding connector on a neighbouring wind turbine blade via a connecting member.

The reinforcing member may comprise a first portion and a second portion; the method comprising placing the spar cap and connector into the mould and onto the first portion, and folding the second portion of the reinforcing member over the spar cap and connector such that the reinforcing member wraps around the connector with the first and second portions of the reinforcing member placed on opposite sides of the spar cap.

Prior to folding the second portion of the reinforcing member over the spar cap and connector, the method may comprise placing a core material onto the first portion of the reinforcing member and folding the second portion of the reinforcing member over the spar cap and connector, wherein the core material extends from the connector towards the spar cap.

The method of the second aspect may be for manufacturing the blade of a wind turbine of the first aspect.

BRIEF DESCRIPTION OF THE DRAWINGS

Embodiments of the invention will now be described with reference to the accompanying drawings, in which.

DETAILED DESCRIPTION OF EMBODIMENT(S)

In this specification, terms such as leading edge, trailing edge, pressure surface, suction surface, thickness, and chord are used. While these terms are well known and understood to a person skilled in the art, definitions are given below for the avoidance of doubt.

The term leading edge is used to refer to an edge of the blade which will be at the front of the blade as the blade rotates in the normal rotation direction of the wind turbine rotor.

The term trailing edge is used to refer to an edge of a wind turbine blade which will be at the back of the blade as the blade rotates in the normal rotation direction of the wind turbine rotor.

The chord of a blade is the straight line distance from the leading edge to the trailing edge in a given cross section perpendicular to the blade spanwise direction. The term chordwise is used to refer to a direction from the leading edge to the trailing edge, or vice versa.

A pressure surface (or windward surface) of a wind turbine blade is a surface between the leading edge and the trailing edge, which, when the blade is in use, has a higher pressure than a suction surface of the blade.

A suction surface (or leeward surface) of a wind turbine blade is a surface between the leading edge and the trailing edge, which will have a lower pressure acting upon it than that of a pressure surface, when the blade is in use.

The thickness of a wind turbine blade is measured perpendicularly to the chord of the blade and is the greatest distance between the pressure surface and the suction surface in a given cross section perpendicular to the blade spanwise direction.

The term spanwise is used to refer to a direction from a root end of a wind turbine blade to a tip end of the blade, or vice versa. When a wind turbine blade is mounted on a wind turbine hub, the spanwise and radial directions will be substantially the same.

The term spar cap is used to refer to a longitudinal, generally spanwise extending, reinforcing element of the blade. The spar cap may be embedded in the blade shell or may be attached to the blade shell. The spar caps of the windward and leeward sides of the blade may be joined by one or more shear webs extending through the interior hollow space of the blade. The blade may have more than one spar cap on each of the windward and leeward sides of the blade. The spar cap may form part of a longitudinal reinforcing spar or support member of the blade. In particular, the spar caps may form part of the load bearing structure extending in the longitudinal direction that carries the flapwise bending loads of the blade.

The term outboard refers to a radial (blade spanwise) direction from the hub of the blade towards the tip end of the blade. The term inboard refers to a radial direction from the tip end of the blade towards the hub.

Figure 1:
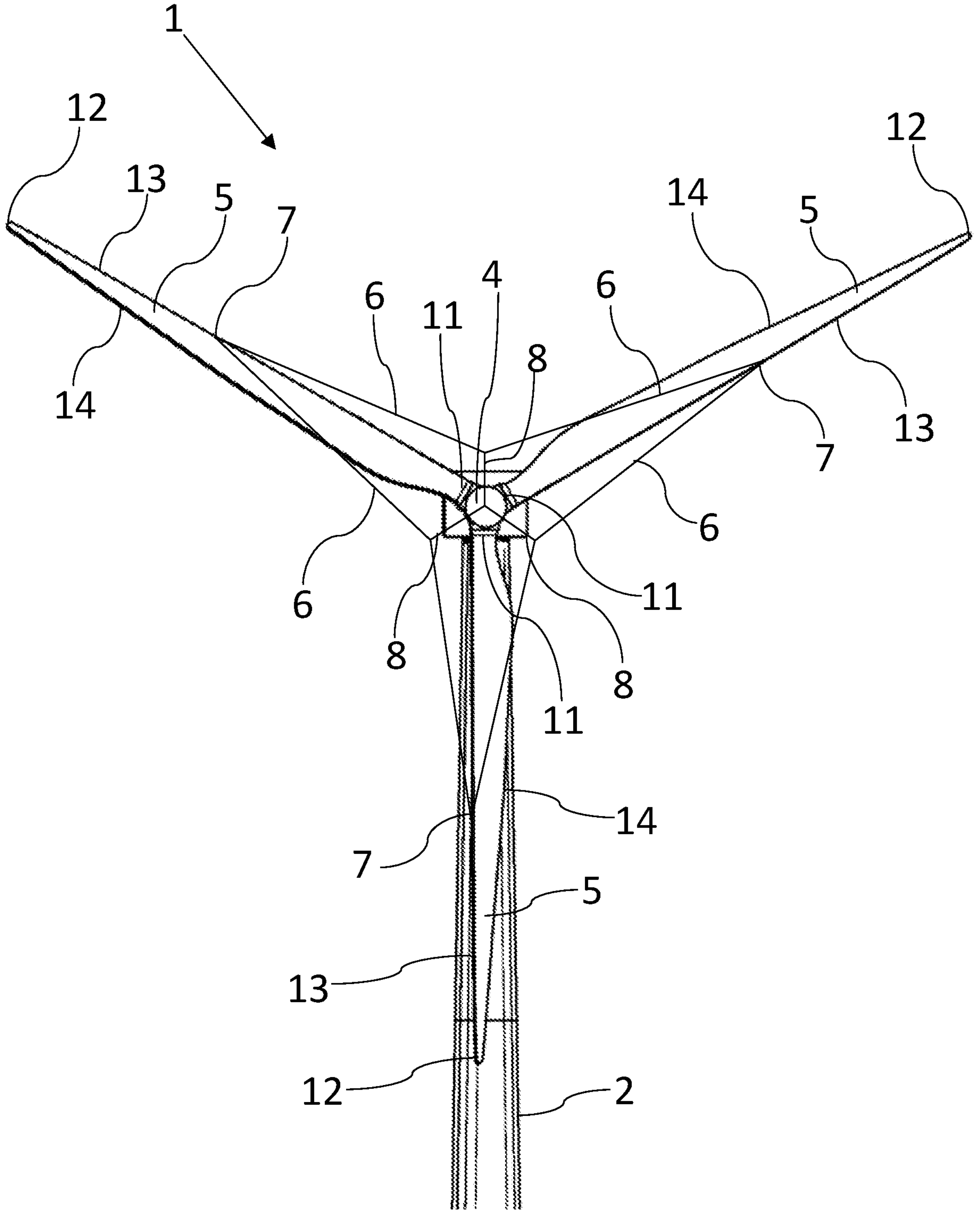
FIG. 1 shows a front view of a wind turbine according to a first example.
Figure 2:
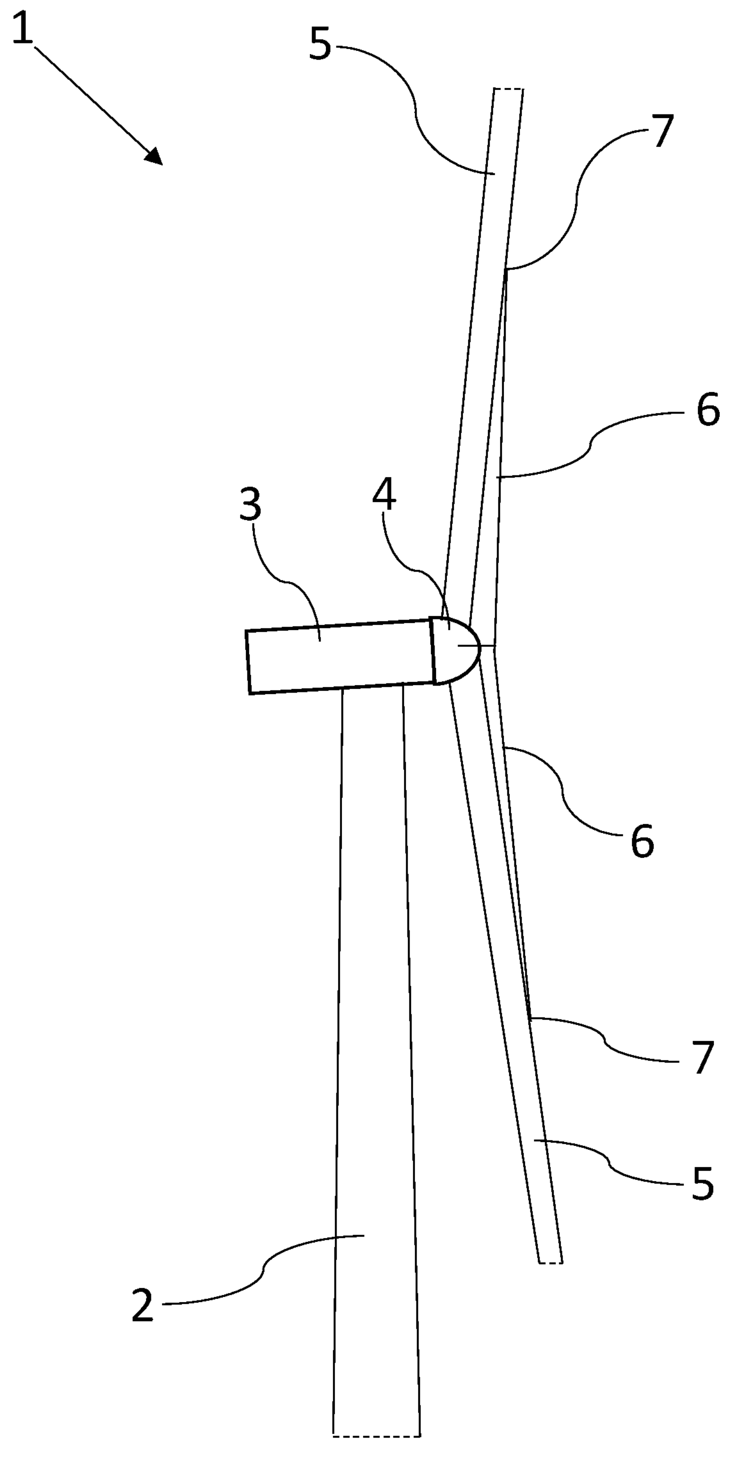
FIG. 2 shows a side view of the wind turbine.

FIGS. 1 and 2 show a pitch controlled wind turbine 1 according to a first example. FIG. 1 is a front view of the wind turbine 1, and FIG. 2 is a side view of the wind turbine 1. The wind turbine 1 comprises a tower 2 and a nacelle 3 mounted on the tower 2. A hub 4 is mounted rotatably on the nacelle 3, and carries three wind turbine blades 5 projecting outwardly from the nacelle 3. While the example shown in FIGS. 1 and 2 has three blades 5, it will be appreciated that other numbers of blades 5 are possible.

When wind blows against the wind turbine 1, the wind turbine blades 5 generate a lift force which causes a generator (not shown) within the nacelle 3 to generate electrical energy.

It will be appreciated that the wind turbine 1 depicted may be any suitable type of wind turbine 1. The wind turbine 1 shown is an upwind wind turbine, although it will be appreciated the wind turbine 1 may be a downwind wind turbine. The wind turbine 1 may be an onshore wind turbine such that the foundation is embedded in the ground, or the wind turbine 1 may be an offshore installation in which case the foundation would be provided by a suitable marine platform.

Three blade connecting members 6 interconnect neighbouring wind turbine blades 5 between connecting points 7 on the wind turbine blades 5. The connecting members 6 are cables, e.g. steel cables. A pre-tension member 8 extends between one of each of the blade connecting members 6 and a common point arranged at or adjacent the hub 4. In the example shown in FIGS. 1 and 2, the pre-tension members 8 extend to the hub 4. The pre-tension members 8 are configured to provide pre-tension in the blade connecting members 6.

The pre-tensioned blade connecting members 6 cause the wind turbine blades 5 to mutually support each other, in the sense that loads on the wind turbine blades 5, in particular edgewise loads and flapwise loads, are 'shared' among the wind turbine blades 5.

Figure 3:
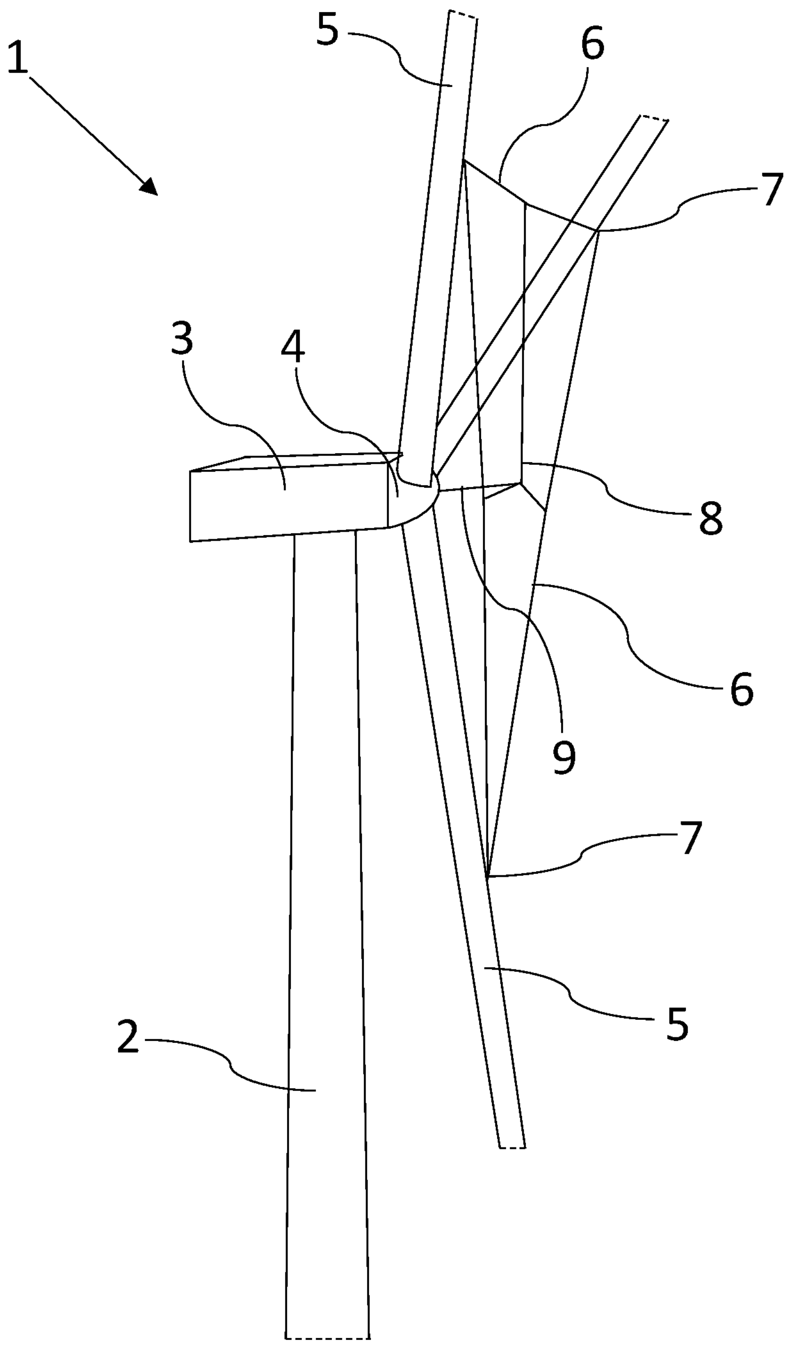
FIG. 3 shows a wind turbine according to a second example.

FIG. 3 is a side view of a pitch controlled wind turbine 1 according to a second example. The wind turbine 1 of FIG. 3 is similar to the wind turbine 1 of FIGS. 1 and 2, and therefore likewise features will not be described in detail here.

The pre-tension members 8 may or may not be connected directly to the hub 4. The pre-tension members 8 may be connected, such as shown in FIG. 3, adjacent the hub 4 and to a hub member 9 which extends from the hub 4 substantially along a direction defined by a rotational axis of the hub 4. As a result, the connection point of the pre-tension members 8 is further from the hub 4 than the example of FIGS. 1 and 2, and thereby further from the positions where the wind turbine blades 5 are connected to the hub 4. This has the consequence that the pre-tension members 8 may also pull the blade connecting members 6 away from the hub 4 and away from the tower 2. This may also cause the wind turbine blades 5 to be pulled in this direction, thereby further reducing edgewise and flapwise loads at the root of the wind turbine blades 5 and securing tower clearance, similar to what is obtained when a coning angle is introduced.

The wind turbine blades 5 have a root end 11 proximal to the hub 4, adapted to be connected to the hub 4 via a pitch mechanism, and a tip end 12 distal from the hub 4. The blades 5 include a leading edge 13 and a trailing edge 14 that extend between the respective root end 11 and tip end 12. The blades 5 include a suction side 15 and a pressure side 16 (See FIGS. 4 and 5). A thickness dimension of the blade 5 extends between the suction side 15 and the pressure side 16.

Each blade 5 may have a cross section which has substantially circular profile near the root end 11. The blade 5 may transition from a circular profile to an aerofoil profile moving from the root end 11 of the blade 5 outboard. The blade 5 may comprise a "shoulder" 28 outboard of the root end 11, which is the widest part of the blade where the blade 5 has its maximum chord. The blade 5 may have an aerofoil profile of progressively decreasing thickness in an outboard portion of the blade 5. The progressively decreasing thickness may extend from the shoulder 28 to the tip end 12.

Figure 4:
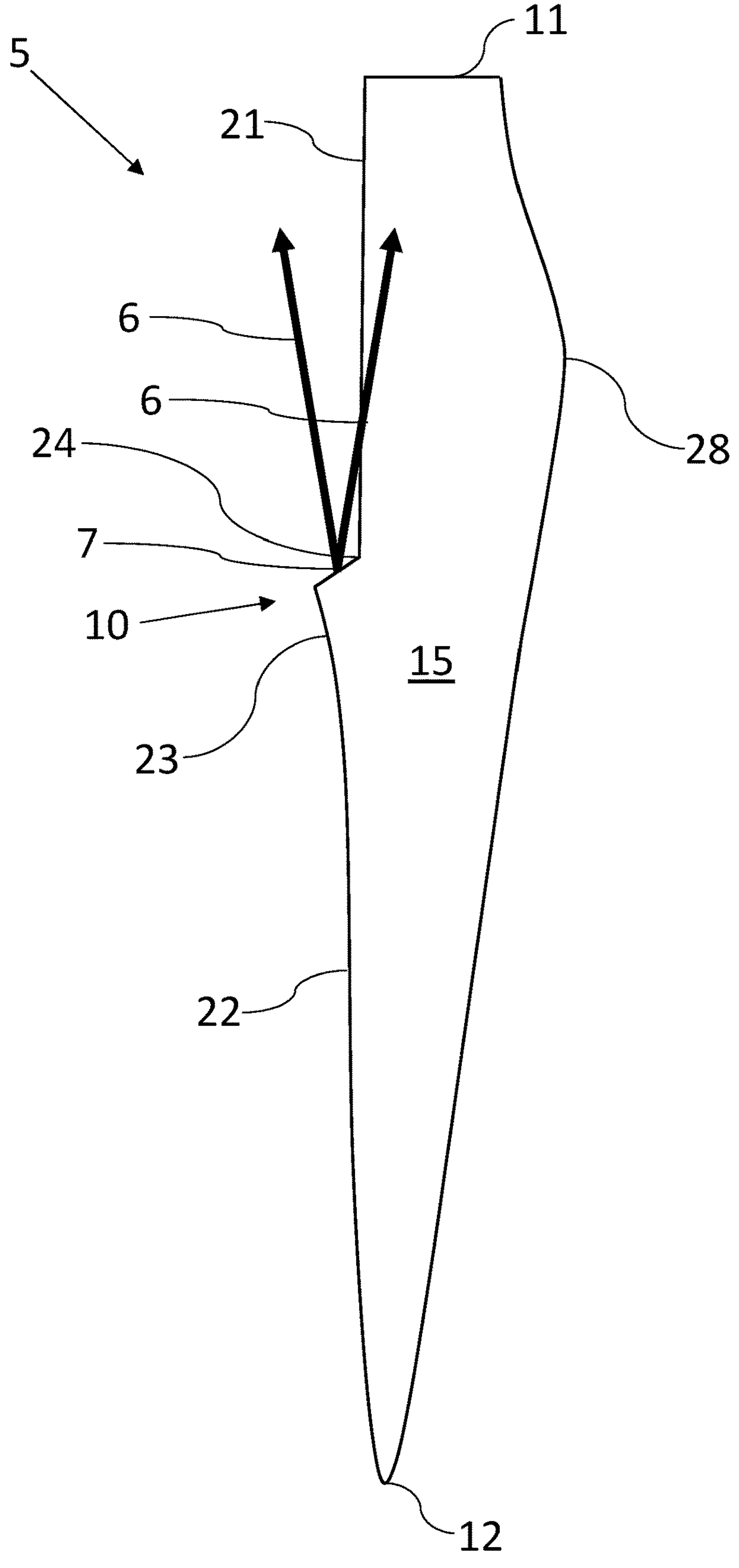
FIG. 4 shows a wind turbine blade.

In the example shown in FIG. 4, the connecting point 7 is located at approximately 40% of the blade length in the radial direction from the root end 11. Although it will be appreciated that the connecting point 7 may be at any position along the blade 5. The connecting point 7 may be between 10% and 60% of the length of the wind turbine blade 5 from the root end 11 to the tip end 12 in the radial direction but is preferably radially inboard of 50% of the length of the wind turbine blade 5 from the root end 11 to the tip end 12, and more preferably radially inboard of 45% of the length of the wind turbine blade 5 from the root end 11 to the tip end 12.

The connecting point 7 is located at a connection region 10 of the blade 5. The connecting region 10 may extend forward of the leading edge 21 of the blade 5 inboard of the connecting region 10 and the leading edge 22 of the blade 5 outboard of the connecting region 10. The connection region 10 is such that the blade 5 may be continuous from the root end 11 to the tip end 12.

In the example shown in FIG. 4, the leading edge 23 of the connection region 10 smoothly blends into the leading edge 22 of the blade 5 outboard of the connection region 10. For example, the leading edge 23 of the connection region 10 may curve from the connection point 7 to the leading edge 22 of the blade 5 outboard of the connection region 10. Although it will be appreciated that in other examples the leading edge 23 of the connection region 10 may sharply transition into the leading edge 22 of the blade 5 outboard of the connection region 10, for example forming a vertex between the leading edges 22, 23.

The leading edge 21 inboard of the leading edge 23 of the connection region 10 is shown to sharply transition into the leading edge 23 of the connection region 10, with a vertex 24 formed between the leading edges 21, 23. Providing a smooth transition may reduce stress concentrations, whereas providing a generally sharp transition may provide additional clearance for the connecting member 6 or other components. Although it will be appreciated that the leading edge 23 of the connection region 10 may smoothly blend into the leading edge 21 of the blade 5 inboard of the connection region 10. For example, the leading edge 23 of the connection region 10 may curve from the connection point 7 to the leading edge 21 of the blade 5 inboard of the connection region 10.

Similarly, the connection region 10 may extend outwards from the blade 5 so as to increase the local thickness of the blade 5 at the connection region 10 relative to the thickness of the blade 5 inboard of the connection region 10 and outboard of the connection region 10. This is shown in the perspective view of FIG. 5, and the spanwise view in FIG. 6 taken at the cross-section i-i indicated in FIG. 5. The connection points 7 may be arranged at a position where a thickness-to-chord ratio of the wind turbine blade 5 is between 20% and 50%. The increase in thickness of the blade 5 may be more pronounced on the pressure side 16 of the blade 5, such that the leading edge of the connection region extends outwards from the blade on a pressure side of the respective blade.

Figure 5:
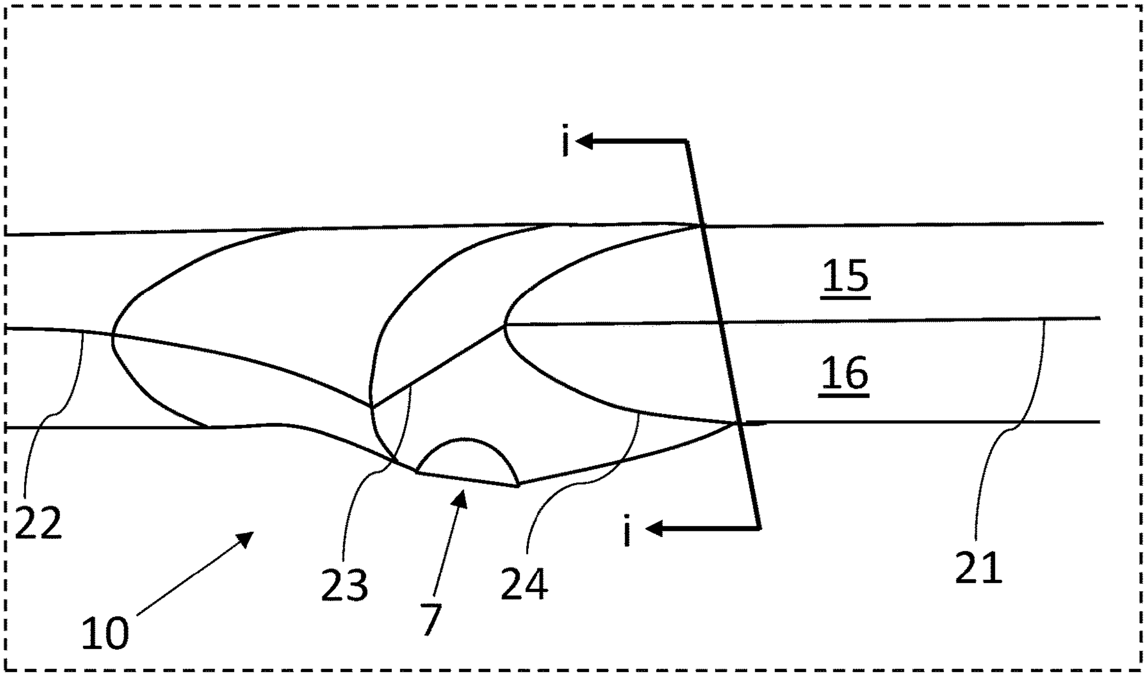
FIG. 5 shows a connection region of a wind turbine blade from which connecting members extend.
Figure 6:
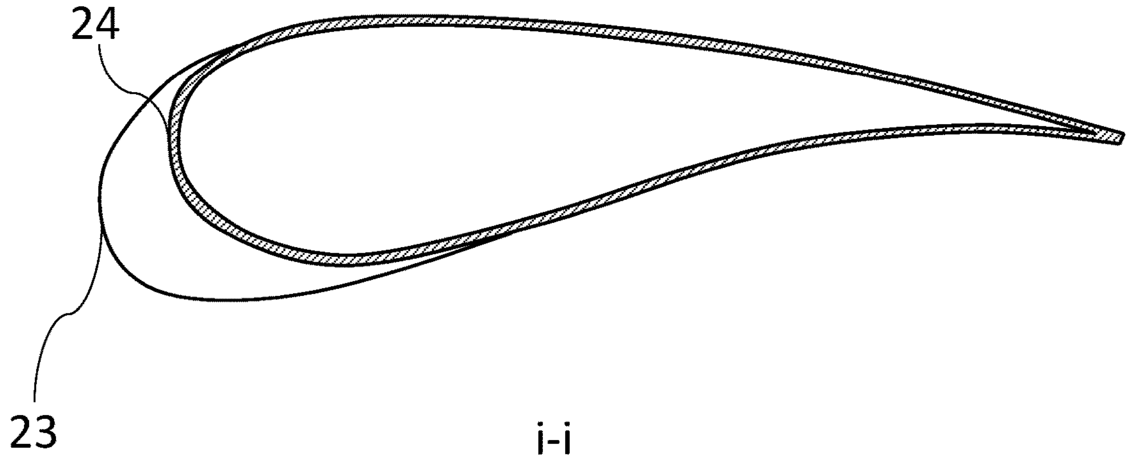
FIG. 6 shows a cross-section of the blade.

The thickness of the blade 5 at the connection region 10 may smoothly transition to the portion of the blade 5 outboard of the connection region 10 and may sharply transition to the portion of the blade 5 inboard of the connection region 10, such as shown in FIG. 5. Providing a smooth transition may reduce stress concentrations, whereas providing a generally sharp transition may provide additional clearance for the connecting member 6 or other components. Although it will be appreciated that change in thickness at either end of the connection region 10 may be a smooth transition or sharp transition.

Extending the connection region 10 so that the leading edge 23 of the connection region 10 extends forward of the inboard and outboard leading edges 21, 22 of the blade 5 provides additional clearance for the connecting members 6 as the wind turbine blades 5 rotate with the hub 4 about the nacelle, thereby increasing the range of motion of the blades 5 relative to the connecting members 6. Similarly, increasing the thickness of the blade 5 at the connection region 10, and more particularly providing a more pronounced increase in thickness on the pressure side 16 of the blade 5, provides additional clearance for the connecting members 6.

Figure 7:
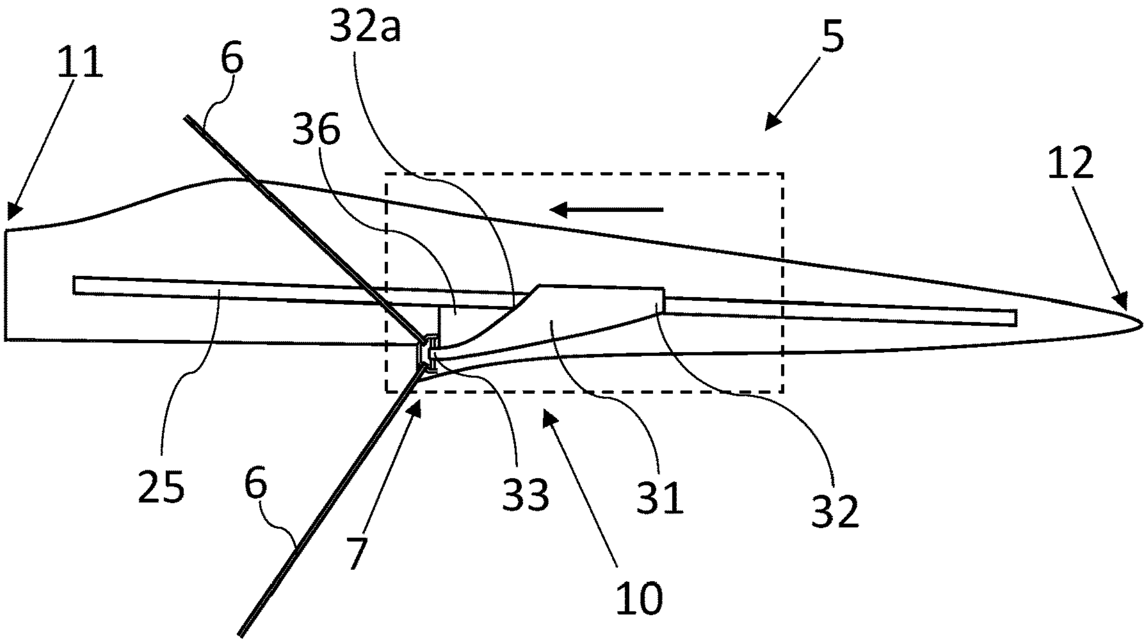
FIG. 7 shows a reinforcing member extending from a connection point to the spar cap of the blade.

As shown in FIG. 7, each wind turbine blade 5 has a spar cap 25 that extends in a spanwise direction of the blade 5 between the root end 11 and the tip end 12. The spar cap 25 may be continuous across the connection region 10. The spar cap 25 may be continuous along substantially its entire length between the root end 11 and the tip end 12.

A reinforcing member 31 extends from the connection point 7 to the spar cap 25. In particular, the reinforcing member 31 has an anchor end 32 that overlaps a portion of the spar cap 25, and a connection end 33 having the connection point 7, such that the reinforcing member 31 extends continuously from the connection point 7 to the anchor end 32 so as to transfer load between the spar cap 25 and the respective connecting member 6.

The anchor end 32 preferably overlaps the spar cap 25 at a location outboard of the connection point 7, such as shown in FIG. 7, so that the reinforcing member 31 extends outboard to oppose the loads on the connecting members 6 that are directed generally inboard. However, it will be understood that the anchor end 32 may overlap the spar cap 25 at any spanwise position, including inboard of the connection point 7.

The reinforcing member 31 may be formed of any suitable material, such as metal, although preferably includes fibre-reinforced composite material. The fibre-reinforced composite material may include glass and/or carbon fibres. The fibre-reinforced composite materials may be formed from pre-preg or dry fibre preforms.

Fibre reinforced composite materials have an increased stiffness when the fibres are oriented in the load direction. In the present case, the majority of the fibres of the fibre-reinforced composite material may be oriented generally towards the blade spanwise direction. Preferably, the majority of the fibres are oriented within 20 degrees of the spanwise direction of the blade 5. A majority may refer to more than 50% of the fibres being oriented in the spanwise direction of the blade 5, although preferably more than 80% of the fibres are oriented in the spanwise direction of the blade 5.

The reinforcing member 31 may extend from the connection point 7 to a spar cap 25 on the pressure side 16 of the blade 5. The reinforcing member 31 may extend from the connection point 7 to the spar cap 25 only on a pressure side 16 of the blade 5, such that the reinforcing member 31 does not extend to a spar cap 25 on the suction side 15 of the blade 5.

Figure 8:
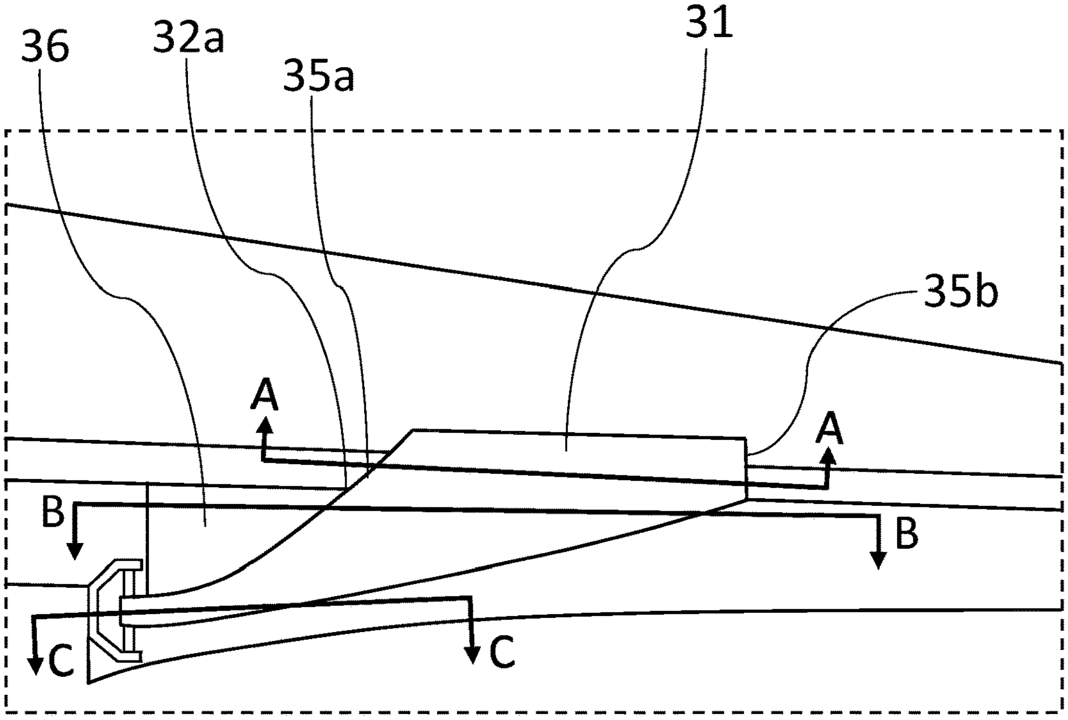
FIG. 8 shows a close-up view of the reinforcing member of FIG. 8.

The width of the reinforcing member 31 may increase from the connection end 33 to the anchor end 32. The width of the reinforcing member 31 may be measured in the chordwise direction of the blade 5, such that the width of the reinforcing member 31 increases in the spanwise direction of the blade 5. As shown most clearly in FIG. 8, the width of the reinforcing member 31 in the chordwise direction may increase outboard from the connection point 7 up to an inboard edge 32*a* of the anchor end 32.

Figure 9:
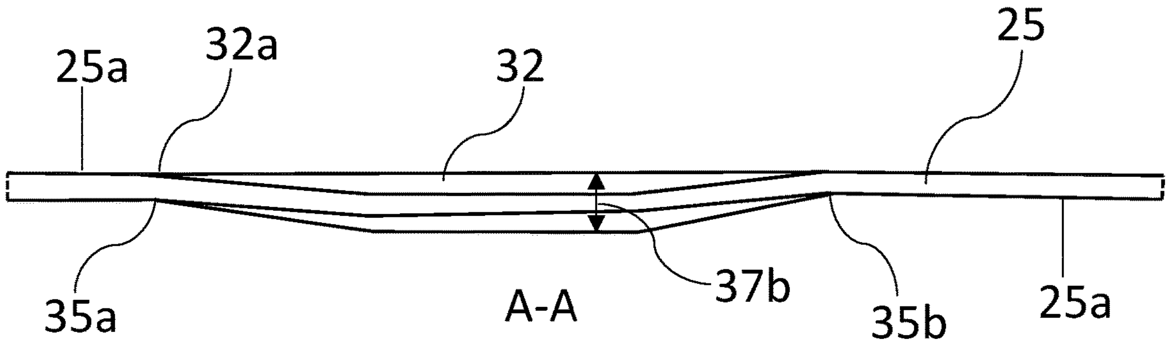
FIG. 9 shows a cross-section, A-A, of the spar cap at the position the reinforcing member overlaps the spar cap.

As previously mentioned, the anchor end 32 of the reinforcing member 31 overlaps a portion of the spar cap 25. The anchor end 32 may overlap the inner side 25*a* of the spar cap 25 (i.e. the side of the spar cap 25 distal from an outer aerodynamic surface of the blade 5) and/or the outer side 25*b* of the spar cap 25 (i.e. the side of the spar cap 25 adjacent an outer aerodynamic surface of the blade 5). Overlapping the spar cap 25 improves the load transfer between the anchor end 32 of the reinforcing member 31 and the spar cap 25 due to the large contact area. In the example shown in FIG. 9, the reinforcing member 31 overlaps an inner side 25*a* of the spar cap 25 and an outer side 25*b* of the spar cap 25 such that, for a given spanwise extent, the reinforcing member 31 is attached to a greater surface area of the spar cap 25 than is possible with overlap of one or the other of the inner and outer sides 25*a*, 25*b*. To accommodate the reinforcing member 31, at the position the reinforcing member 31 overlaps the spar cap 25, the spar cap 25 may have a longitudinal axis which deviates in a blade thickness direction on either side of the reinforcing member 31. FIG. 9 shows the spar cap 25 deviating towards an outer surface of the blade 5. This may be preferable to maintain the blade outer aerodynamic profile. The spar cap 25 may deviate adjacent an inboard end 35*a* of the anchor end 32 and deviate adjacent an outboard end 35*b* of the anchor end 32. It will be understood that the spar cap 25 may similarly deviate in examples in which the anchor end 32 overlaps the outer side 25*a* of the spar cap 25 and/or the outer side 25*b* of the spar cap 25.

The thickness of the reinforcing member 31 may vary between the connection point 7 at the connection end 33 and the anchor end 32. As will be apparent from FIGS. 9, 10 & 11, the thickness may vary from a first thickness 37*a* adjacent the connection end 33, where the fibre reinforced composite material extends either side of a connector 40 of the connection point 7 (as will be discussed in further detail in relation to FIGS. 12 and 13) to a second thickness 37*b* adjacent the anchor end 32, where the fibre reinforced composite material extends to the spar cap 25. The first thickness 37*a* may be greater than the second thickness 37*b*. The relative change in thickness may, at least in part, account for the difference in thickness between the connector 40 at the connection end 33 and the thickness of the spar cap 25 at the anchor end 32.

Figure 10:
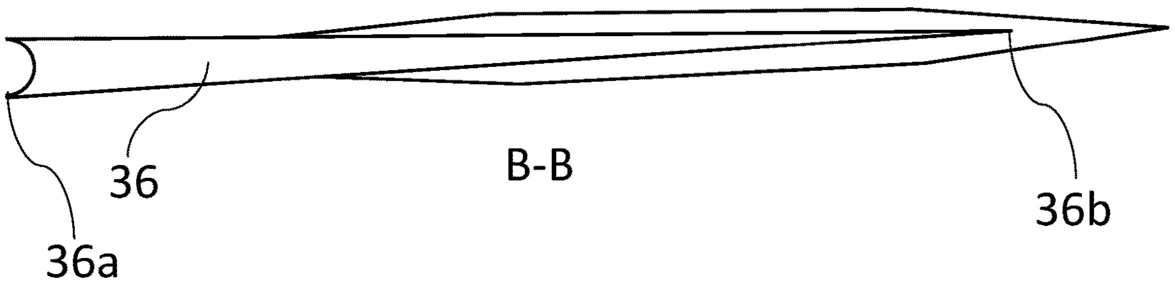
FIG. 10 shows a cross-section, B-B, of the reinforcing member.
Figure 11:
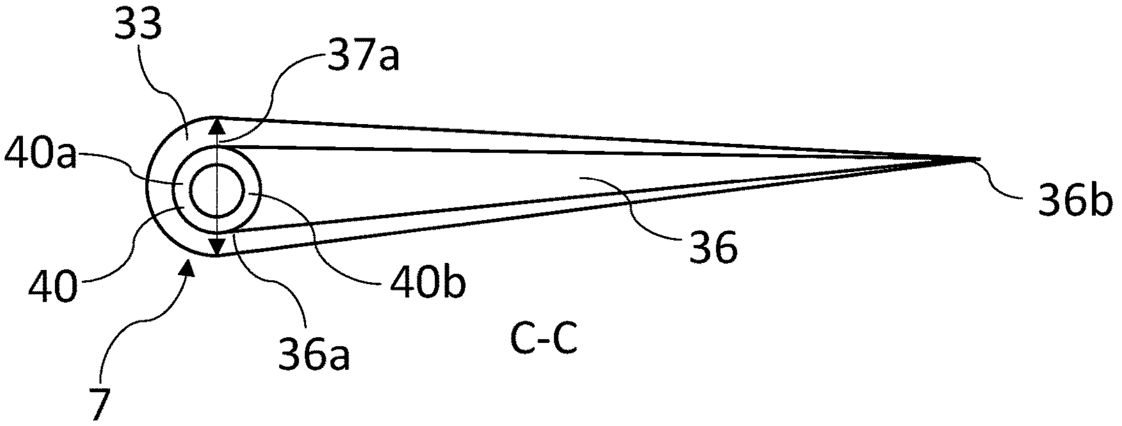
FIG. 11 shows a cross-section, C-C, of the reinforcing member at the connection point.

The reinforcing member 31 may include a core material 36. The core material 36 may extend from the connection end 33 towards the anchor end 32. The core material 36 may reduce the quantity of fibre reinforced composite material required for the reinforcing member 31. In particular, the core material 36 may help transition from the thickness at the connection end 33 to the thickness at the anchor end 32. The core 36 may reduce in thickness, in the spanwise direction of the blade 5, between an inboard end 36*a* and an outboard end 36*b*, such as shown in FIGS. 10 and 11. The thickness of the core material 36 may taper away from the connection end 33 so as to reduce in thickness towards the anchor end 32, as is apparent when comparing FIGS. 10 and 11.

The use of a core 36 may reduce the weight of the reinforcing member 31, for example the core material 36 may be lighter than the fibre reinforced composite material. The core material 36 may be a foam. The core material 36 may form a supporting structure for the fibre reinforce composite material of the reinforcing member 31, so as to help keep the fibres of the fibre reinforcing material generally straight, or at least avoid having sharp angles that may reduce the load bearing performance of the fibre reinforced composite material.

The connector 40 may be embedded in the reinforcing member 31. The reinforcing member 31 may extend around a portion of the connection point 7. The fibre reinforced composite material may extend around a portion of the connection point 7 with the fibres of the reinforcing member 31 continuous around the portion of the connection point 7. As the reinforcing member 31 wraps around the connection point 7, the width of the reinforcing member 31 at the connection point 7 that contacts the connector 40 may be reduced, in comparison to the reinforcing member 31 not wrapping around the connection point 7, due to the increased load bearing capacity of continuous fibres.

The fibre reinforced composite material of the reinforcing member 31 may contact an inboard portion 40*a* of the connector 40 and not an outboard portion 40*b* of the connector 40, for example as shown in FIG. 11, such that the fibre reinforced composite material contacts a semi-cylindrical inboard portion of the connector 40. However, it will be appreciated that the fibre reinforced composite material of the reinforcing member 31 may contact the outboard portion 40*b* of the connector 40, or other portion of the connector 40, depending on the position of the connection end 33 relative to the anchor end 32.

As previously mentioned, neighbouring wind turbines blades 5 interconnect via blade connecting members 6 that extend from a connection point 7 on one wind turbine blade 5 towards a connection 7 point on a neighbouring wind turbine blade 5. Each connection point 7 includes a connector 40 from which the one or more connecting members 6 extend. The blade connecting member 6 may extend from a connection point 7 on one wind turbine blade 5 towards a connection 7 point on a neighbouring wind turbine blade 5.

The connector 40 may be rigidly connected to the connecting members 6 and/or the reinforcing member 31. Alternatively, the connection point 7, and in particular the connector 40 of the connection point 7, may include a bearing structure 42 that attaches to the connecting member(s) 6 and provides freedom of movement of the respective connecting member 6 about at least one axis. In this manner, the connecting members 6 may not be rigidly fixed to reinforcing member 31 at the connection point 7.

Figure 13:
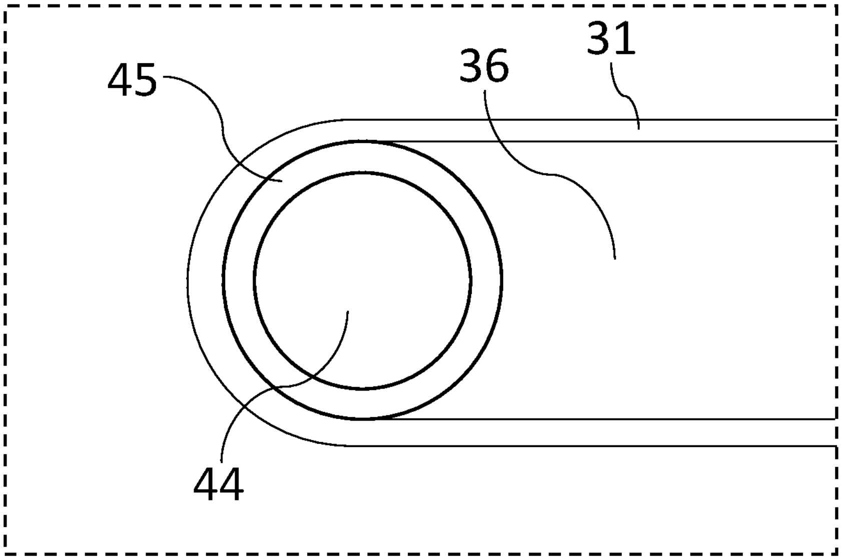
FIG. 13 shows a cross-section of the connector.

The bearing structure 42 may include a coupling element 44 that extends through the connection end 33 of the reinforcing member 31. A bushing 45 may be positioned between the coupling element 44 and the reinforcing member 31, such as shown in FIG. 13, with the bushing 45 providing for rotational movement of the coupling element 44 about its longitudinal axis relative to the reinforcing member 31.

Figure 12:
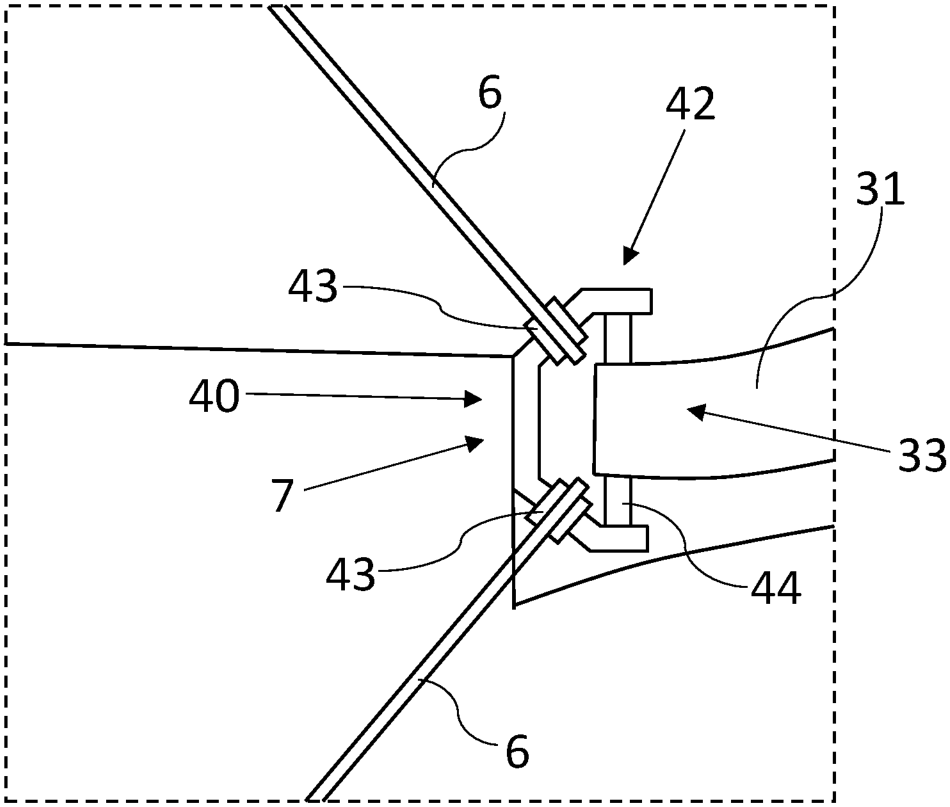
FIG. 12 shows a connector of the connection region.

The bearing structure 42 may include a bearing 43 to which the, or each, connecting member 6 attaches. The bearing 43 may provide freedom of movement about two orthogonal directions. The bearing 43 may be a spherical plain bearing 43. Each connecting member 6 may connect to a respective bearing 43, such as shown in FIG. 12.

The method of manufacturing a wind turbine blade 5 will now be described.

Figure 14:
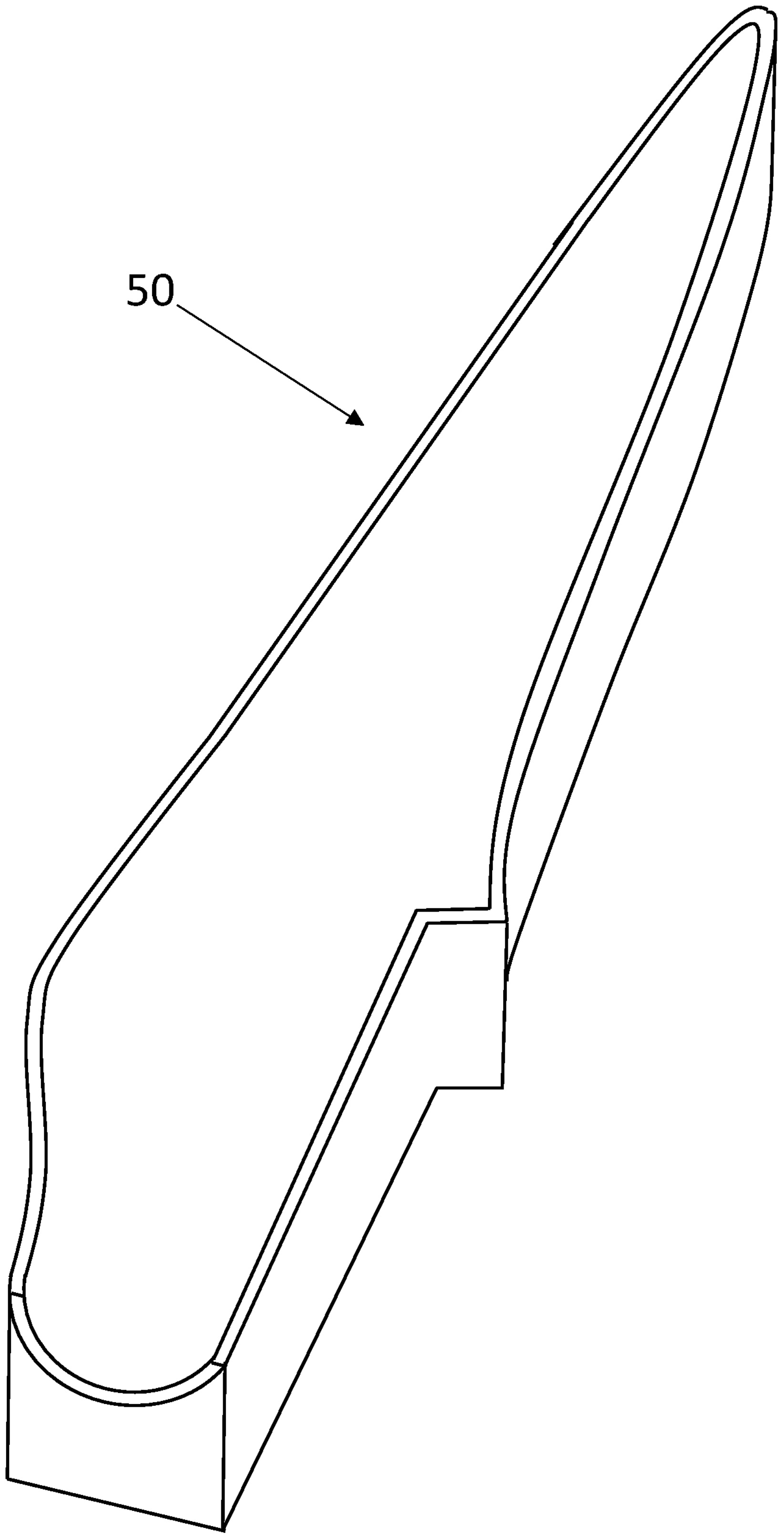
FIG. 14 shows a blade mould.

A half-shell of the wind turbine blade 5 is manufactured in a blade mould 50. FIG. 14 shows a blade mould 50 for forming the full length of a pressure side 16 of a blade 5.

Figure 15:
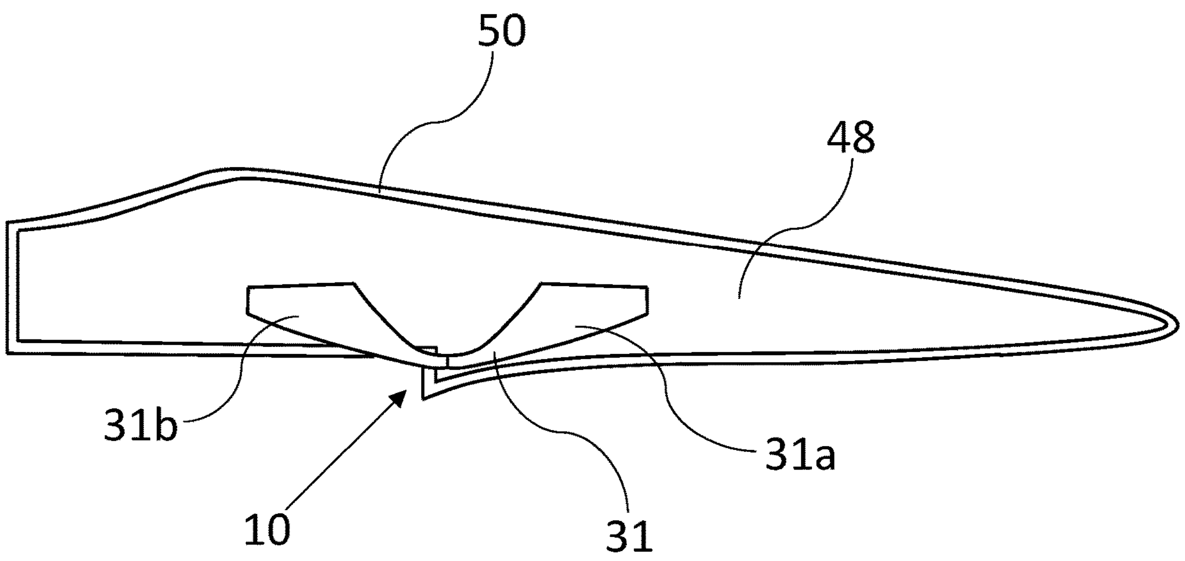
FIG. 15 shows a reinforcing member laid into the mould.

Layers of fibre-reinforced material of the blade skin 48 may be laid in the mould 50. A reinforcing member 31 is then laid in the blade mould 50 at the connection region 10. The reinforcing member 31 may comprise a first portion 31*a* and a second portion 31*b*, with only the first portion 31*a* laid at the connection region, such as shown in FIG. 15. The second portion 31*a* may extend inboard from the first portion 31*b*, such that the second portion is inboard of the connection region 10.

The reinforcing member 31 may be provided as layers of fibrous material, such as dry glass fibres or pre-preg glass fibres.

Figure 16:
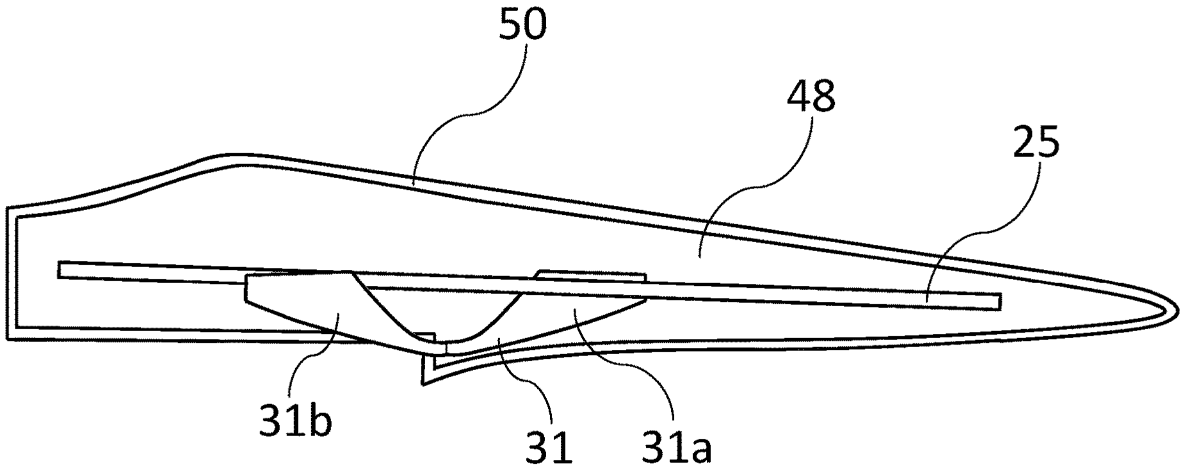
FIG. 16 shows a spar cap laid into the mould.

A spar cap 25 is subsequently added into the mould 50 on top of the reinforcing member 31 so as to overlap the anchor end 32 of the reinforcing member 31. The spar cap 25 may be laid on top of only a portion of the reinforcing member 31, for example the spar cap 25 may be placed on top of the first portion 31*a* of the reinforcing member 31 and not the second portion 31*b* of the reinforcing member, such as shown in FIG. 16.

Figure 17:
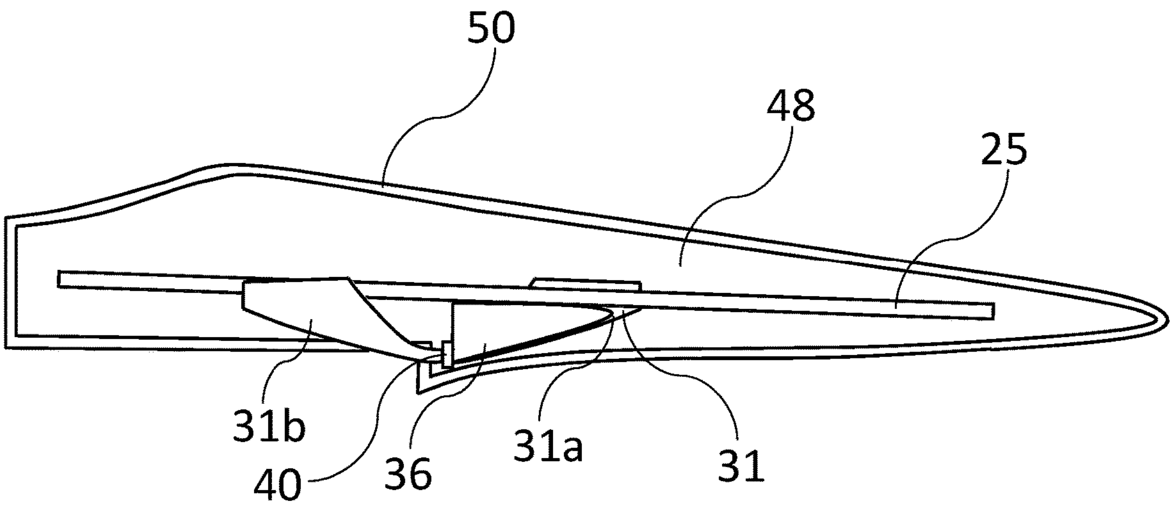
FIG. 17 shows a core material placed into the mould.

The core material 36 may be placed onto at least a portion of the reinforcing member 31. The core material 36 may be placed onto the first portion 31*a* of the reinforcing member 31, such as shown in FIG. 17.

A connector 40 is placed into the mould 50 at the connection end 33 of the reinforcing member 31, such that at least a portion of the reinforcing member 31 extends continuously from the connector 40 to the anchor end 32 of the reinforcing member 31.

The core material 36 may extend from the connector 40 towards the spar cap 25.

Figure 18:
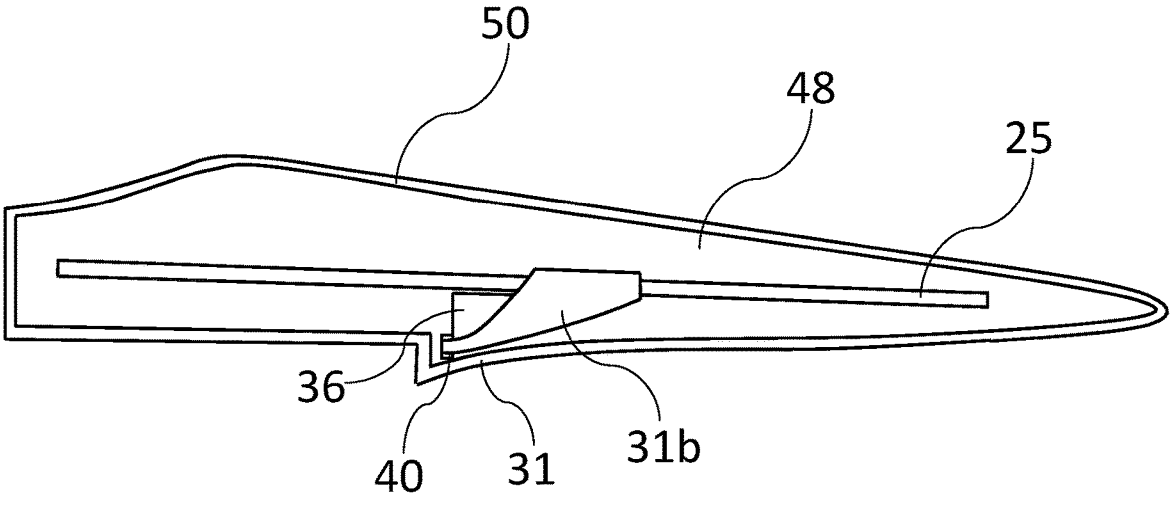
FIG. 18 shows a portion of the reinforcing member folded over the core material and reinforcing member.

The second portion 31*b* of the reinforcing member 31 may be folded over the connector 40 and spar cap 25 as shown in FIG. 18. In this manner, the first and second portions 31*a*, 31*b* of the reinforcing member 31 may be placed on opposite sides of the spar cap 25 and the reinforcing member 31 may wrap around the connector 40, with the first and second portions 31*a*, 31*b* of the reinforcing member 31 connected at an inboard portion 40*a* of the connector 40 and extending either side of the connector 40.

The first portion 31*a* and the second portion 31*b* of the reinforcing member 31 may have substantially the same size and shape such that the second portion 31*b* entirely overlaps the first portion 31*a*, although it will be appreciated the first and second portions 31*a*, 31*b* may have different sizes and/or shapes.

Subject to the addition of any additional parts to the blade mould 50, e.g. the additional fibre reinforced composite material in examples in which the spar cap 25 is embedded in the shell of the blade 5, the shell of blade 5 is cured to form an integral structure. Typically, the spar cap 25 is rigidly formed (i.e. cured fibre reinforced composite material) prior to addition to the mould, in which case the reinforcing member 31 is co-bonded to the spar cap 25, although it will be appreciated that the reinforcing member 31 may be co-cured with at least a portion of materials forming the remainder of the blade 5. A blade shell of a suction side 15 of the blade 5 may be formed and attached to the manufactured blade shell of the pressure side 16 described above, with the blade shell of the suction side 15 of the blade 5 absent a reinforcing member 31 extending from a connection point 7 to the respective spar cap 25 of the blade shell.

In an example, the reinforcing member may be provided as a pre-fabricated cured component that is integrated into the blade and attached to the spar cap.

Figure 19:
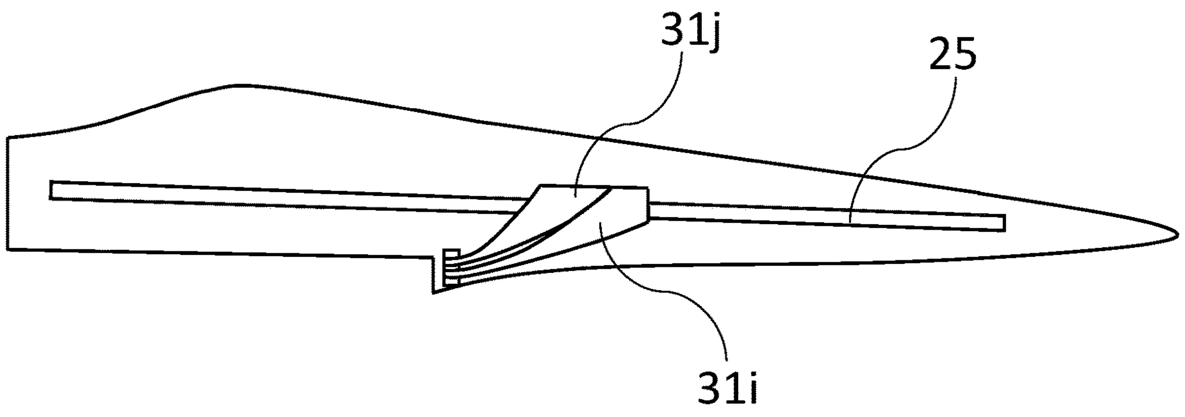
FIG. 19 shows an alternative arrangement with two reinforcing members.
Figure 20:
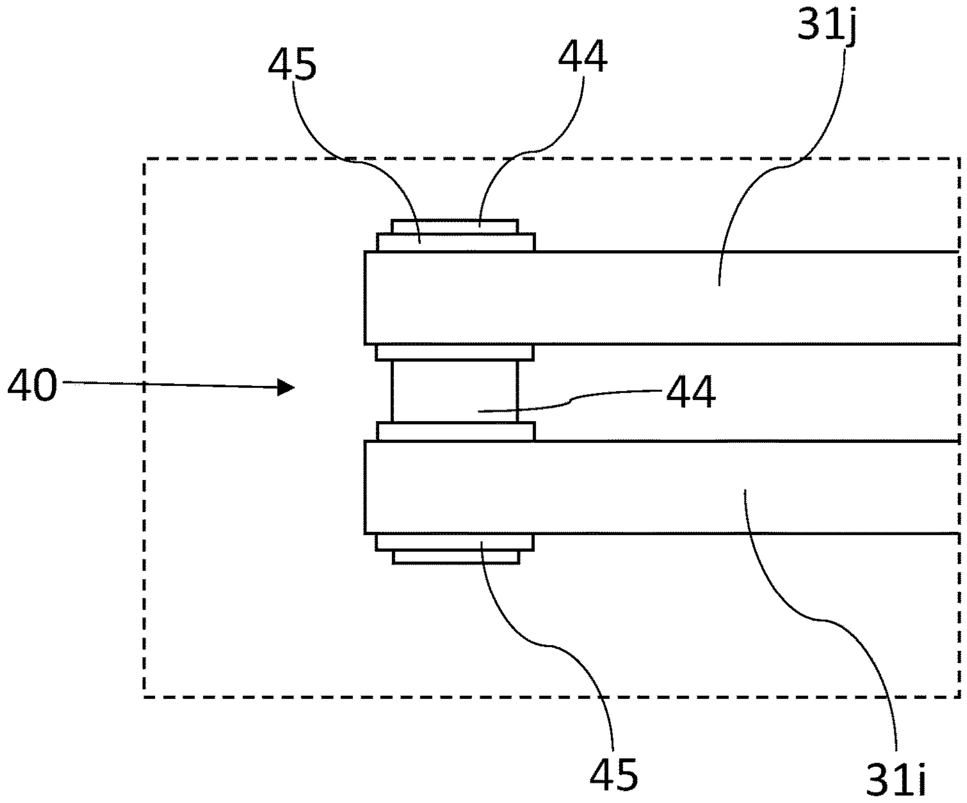
FIG. 20 shows a plan view of the reinforcing members of FIG. 19.

In some examples, the blade 5 may comprise a plurality of reinforcing members 31 at substantially the same spanwise position. FIGS. 19 and 20 show a first reinforcing member 31*i* and a second reinforcing member 31*j*. A common connector 40 may be embedded in the first and second reinforcing members 31*i*, 31*j*, such as shown in FIG. 20. Alternatively, each of the first and second reinforcing members 31*i*, 31*j* may attach to separate connectors 40.

A bushing 45 may be positioned between the coupling element 44 and each of the first and second reinforcing members 31*i*, 31*j*, such as shown in FIG. 20. Alternatively, a common bushing 45 may extend across the coupling element 44 between the first and second reinforcing members 31*i*, 31*j*.

It will be appreciated that the connector 40 may be any suitable element that provides a connection between the reinforcing member 31 and each connecting member 6.

In the example shown in FIGS. 12 and 13, the reinforcing member 31 extends from a cylindrical coupling element 44 on which a bushing 45 may be mounted so as to provide for relative rotation between the coupling element 44 and the reinforcing member 31, and thereby provide for relative rotation between each connecting member 6 and the reinforcing member 31 about at least one axis.

Figure 21:
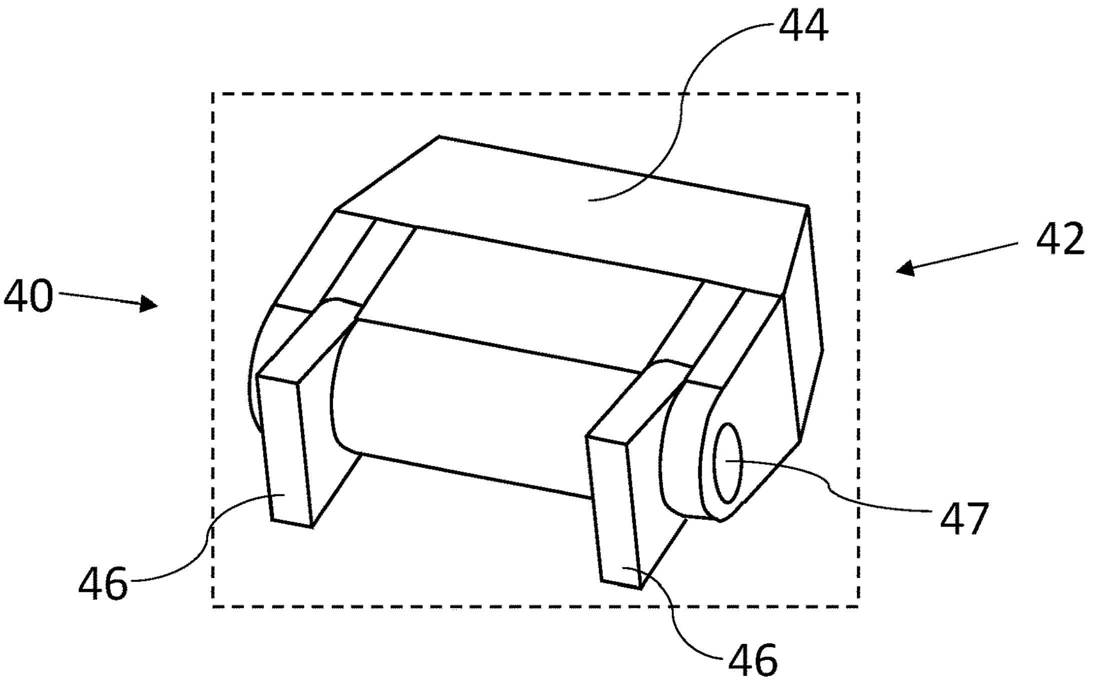
FIG. 21 shows an alternative example of a connector.
Figure 22:
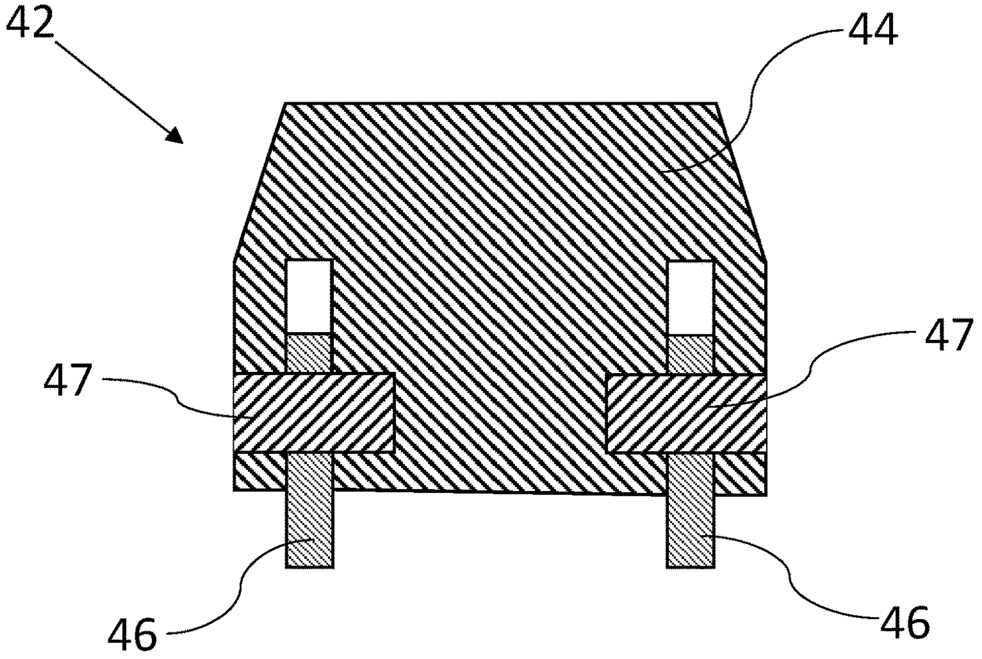
FIG. 22 shows a cross-section of the connector of FIG. 21.

In alternative examples, the coupling element 44 may be fixedly attached to the reinforcing member 31. The portion 40*a*, 40*b* of the connector 40 to which the fibre reinforced composite material of the reinforcing member 31 contacts may be semi-cylindrical, with the other of the portions 40*a*, 40*b* non-cylindrical. In these examples, relative rotation between each connecting member 6 and the reinforcing member 31 may be provided by a bearing structure 42 including a link 46 rotatable about a pin 47 extending through the coupling element 44, such as shown in FIGS. 21 and 22. It will be appreciated that the bearing structure 42 may provide a respective pin 47 rotatably coupled to each link 46, or a common pin 47 to which two or more links 46 attach.

Although the invention has been described above with reference to one or more preferred embodiments, it will be appreciated that various changes or modifications may be made without departing from the scope of the invention as defined in the appended claims.

The invention claimed is:

1. A pitch controlled wind turbine, comprising:
a tower;
a nacelle mounted on the tower;
a hub mounted rotatably on the nacelle; and
at least three wind turbine blades, wherein each wind turbine blade comprises:
a root end connected to the hub;
a tip end;
a blade shell forming an outer surface of the wind turbine blade;
a spar cap extending in a spanwise direction between the root end and the tip end; and
a reinforcing member having an anchor end and a connection end, the connection end having a connection point located at a connection region of the wind turbine blade, the reinforcing member extending continuously from the connection point to the anchor end which overlaps a portion of the spar cap, and at least a portion of the reinforcing member being inside the blade shell; and
at least three blade connecting members, each of the at least three blade connecting members extending from the connection point on one of the at least three wind turbine blades towards the connection point on a neighbouring one of the at least three wind turbine blades,
wherein for each of the at least three wind turbine blades, the reinforcing member transfers loads between the spar cap and at least one of the at least three blade connecting members.

2. The pitch controlled wind turbine of claim 1, wherein the anchor end overlaps the portion of the spar cap outboard of the connection point.

3. The pitch controlled wind turbine of claim 1, wherein the reinforcing member is integral with the spar cap.

4. The pitch controlled wind turbine of claim 3, wherein the reinforcing member is co-bonded with the spar cap.

5. The pitch controlled wind turbine of claim 1, wherein the reinforcing member includes a fibre-reinforced composite material.

6. The pitch controlled wind turbine of claim 5, wherein a majority of the fibres of the fibre-reinforced composite material is oriented generally towards the blade spanwise direction.

7. The pitch controlled wind turbine of claim 6, wherein the majority of the fibres is oriented within 20 degrees of the spanwise direction of the blade.

8. The pitch controlled wind turbine of claim 5, wherein the reinforcing member extends around a portion of the connection point, and fibres of the reinforcing member are continuous around the portion of the connection point.

9. The pitch controlled wind turbine of claim 1, wherein, for each of the at least three wind turbine blades, a width of the reinforcing member in a chordwise direction increases from the connection point up to an inboard edge of the anchor end.

10. The pitch controlled wind turbine of claim 1, wherein the reinforcing member extends from the connection end and overlaps an inner side of the spar cap and an outer side of the spar cap.

11. The pitch controlled wind turbine of claim 1, wherein the spar cap has a longitudinal axis which deviates in a blade thickness direction on either side of the reinforcing member.

12. The pitch controlled wind turbine of claim 1, wherein the spar cap is continuous between the root end and the tip end.

13. The pitch controlled wind turbine of claim 1, wherein the connection region has a leading edge forward of a leading edge of the blade inboard of the connection region and forward of a leading edge of the blade outboard of the connection region.

14. The pitch controlled wind turbine of claim 13, wherein the leading edge of the connection region is smoothly blended into the blade leading edge outboard of the connection region.

15. The pitch controlled wind turbine of claim 13, wherein the leading edge of the connection point is located on a pressure side of the blade.

16. The pitch controlled wind turbine of claim 13, wherein the connection point is located forward of the leading edge of the blade inboard of the connection region and forward of the leading edge of the blade outboard of the connection region.

17. The pitch controlled wind turbine of claim 1, wherein each connection point comprises a connector, and the connector is embedded in the reinforcing member.

18. The pitch controlled wind turbine of claim 1, wherein the reinforcing member includes a core material.

19. The pitch controlled wind turbine of claim 18, wherein a thickness of the core material decreases from the connection end towards the anchor end.

20. The pitch controlled wind turbine of claim 18, wherein a thickness of the core material changes between the connection end and the anchor end.

21. The pitch controlled wind turbine of claim 1, wherein each connection point comprises a bearing structure configured to provide freedom of movement of the connecting member about at least one axis.

22. The pitch controlled wind turbine of claim 1, wherein the at least three blade connecting members comprise a first connecting member and a second connecting member extending from the connection point.

23. The pitch controlled wind turbine according to claim 1, wherein the wind turbine is an upwind wind turbine.

* * * * *